United States Patent
Xie et al.

(10) Patent No.: US 12,530,765 B2
(45) Date of Patent: Jan. 20, 2026

(54) SYSTEMS AND METHODS FOR CALCIUM-FREE COMPUTED TOMOGRAPHY ANGIOGRAPHY

(71) Applicant: CEDARS-SINAI MEDICAL CENTER, Los Angeles, CA (US)

(72) Inventors: Yibin Xie, West Hollywood, CA (US); Debiao Li, South Pasadina, CA (US); Damini Dey, Los Angeles, CA (US); Yuhua Chen, Los Angeles, CA (US)

(73) Assignee: CEDARS-SINAI MEDICAL CENTER, Los Angeles, CA (US)

( * ) Notice: Subject to any disclaimer, the term of this patent is extended or adjusted under 35 U.S.C. 154(b) by 738 days.

(21) Appl. No.: 17/428,937

(22) PCT Filed: Feb. 18, 2020

(86) PCT No.: PCT/US2020/018678
§ 371 (c)(1),
(2) Date: Aug. 5, 2021

(87) PCT Pub. No.: WO2020/172188
PCT Pub. Date: Aug. 27, 2020

(65) Prior Publication Data
US 2022/0138936 A1 May 5, 2022

Related U.S. Application Data

(60) Provisional application No. 62/807,674, filed on Feb. 19, 2019.

(51) Int. Cl.
*G06T 7/00* (2017.01)
*G06T 7/136* (2017.01)

(52) U.S. Cl.
CPC ............ *G06T 7/0012* (2013.01); *G06T 7/136* (2017.01); *G06T 2207/10081* (2013.01);
(Continued)

(58) Field of Classification Search
CPC ... G06T 7/12; G06T 7/11; G06T 7/136; G06T 7/10; G06T 2207/10081;
(Continued)

(56) References Cited

U.S. PATENT DOCUMENTS

2006/0280350 A1* 12/2006 Conrad-Hansen ........ G06T 7/12
382/128
2008/0107315 A1 5/2008 Kimmel
(Continued)

OTHER PUBLICATIONS

Calcium Removal from Cardiac CT images using Deep CNN, 2018 IEEE 15th International Symposium on Biomedical Imaging, Apr. 2018 (Year: 2018).*

(Continued)

*Primary Examiner* — Stephen S Hong
*Assistant Examiner* — Carl E Barnes, Jr.
(74) *Attorney, Agent, or Firm* — NIXON PEABODY LLP

(57) ABSTRACT

A method of analyzing computed tomography (CT) images comprises receiving an initial CT image of an object, identifying calcium-free regions and a calcified region in the initial CT image of the object, generating a calcium-free image patch, and applying the calcium-free image patch to the initial CT image patch to produce a final CT image. The initial CT image shows a calcium deposit and a target structure in the object. The calcified region in the initial CT image shows the calcium deposit in the object obscuring a portion of the target structure. The calcium-free regions show the remaining portions of the target structure. The calcium-free image patch corresponds to the calcified region in the initial CT image. The final CT image shows the calcium-free image patch and the calcium-free region from the initial CT image. The calcium-free image patch is generated and applied using a convolutional neural network.

18 Claims, 8 Drawing Sheets

(52) U.S. Cl.
CPC ............... *G06T 2207/20081* (2013.01); *G06T 2207/20084* (2013.01); *G06T 2207/30101* (2013.01)

(58) Field of Classification Search
CPC . G06T 2207/20081; G06T 2207/20084; G06T 2207/30101; G06T 2211/40; G06T 2211/404; G06T 2207/0084; G06T 7/0012; G06N 3/0464
See application file for complete search history.

(56) References Cited

U.S. PATENT DOCUMENTS

| | | | |
|---|---|---|---|
| 2008/0219530 A1* | 9/2008 | Levanon | A61B 5/02007 702/19 |
| 2009/0216094 A1 | 8/2009 | De Bruijne | |
| 2011/0206257 A1 | 8/2011 | Qanadli | |
| 2012/0243764 A1 | 9/2012 | Dey | |
| 2015/0097833 A1* | 4/2015 | Razeto | G06T 7/30 345/424 |
| 2016/0171711 A1* | 6/2016 | Gopinath | G06T 19/20 382/130 |
| 2017/0046839 A1 | 2/2017 | Paik | |
| 2017/0372475 A1* | 12/2017 | Gulsun | G06F 18/24133 |
| 2018/0300875 A1* | 10/2018 | Imasugi | G06T 7/174 |
| 2020/0160509 A1* | 5/2020 | Pack | G06N 3/084 |
| 2022/0067992 A1* | 3/2022 | Xu | G10L 15/22 |
| 2023/0157658 A1* | 5/2023 | Dey | A61B 6/504 382/128 |

OTHER PUBLICATIONS

Lijie Zhang, Advances in CT Techniques in Vascular Calcification NPL, Sep. 29, 2021 (Year: 2021).*
Sungjin Lee, Deep-Learning-Based Coronary Artery Calcium Detection from CT Image, Oct. 25, 2021 (Year: 2021).*
J. Sprem Classification of coronary artery calcifications according to motion artifacts in chest CT using a convolutional neural network (Year: 2017).*
R. Annunziata, Leveraging Multiscale Hessian-Based Enhancement With a Novel Exudate Inpainting Technique for Retinal Vessel Segmentation (Year: 2016).*
International Search Report and Written Opinion in International Application No. PCT/US2020/18678, mailed May 22, 2020 (14 pages).
Bastarrika, Y. S. et al., "CT of coronary artery disease," Radiology, 2009.
Dewey, M.., "Coronary CT versus MR angiography: pro CT—the role of CT angiography," Radiology, 2011.
Yoshioka, K. et al., "Subtraction coronary CT angiography for calcified lesions," Cardiology Clinics, 2012.
Criminisi, A. et al., "Object removal by exemplar-based inpainting," CVPR, 2003.
Pathak, D. et al., "Context encoders: Feature learning by inpainting," CVPR, 2016.
Shivaranjani, S. & Priyadharsini, R., "A survey on inpainting techniques," Electrical, Electronics, and Optimization Techniques (ICEEOT), International Conference on IEEE, 2016.
Krizhevsky, A. et al., "Imagenet classification with deep convolutional neural network," NIPS, 2012.
Ronneberger, O. et al., "U-net: convolutional networks for biomedical image segmentation," MICCAI, 2015.
Cicek, O. et al., "3D U-Net: Learning dense volumetric segmentation from sparse annotation," MICCAI, 2016.
Huang, G. et al., "Densely connected convolutional networks," CoRR, 2016.
Abadi, M., "TensorFlow: learning functions at scale," ACM SIGPLAN Notices, 2016.
Dey, D. et al., "Automated three-dimensional quantification of noncalcified coronary plaque from coronary CT angiography: comparison with intravascular US," Radiology, 2010.

* cited by examiner

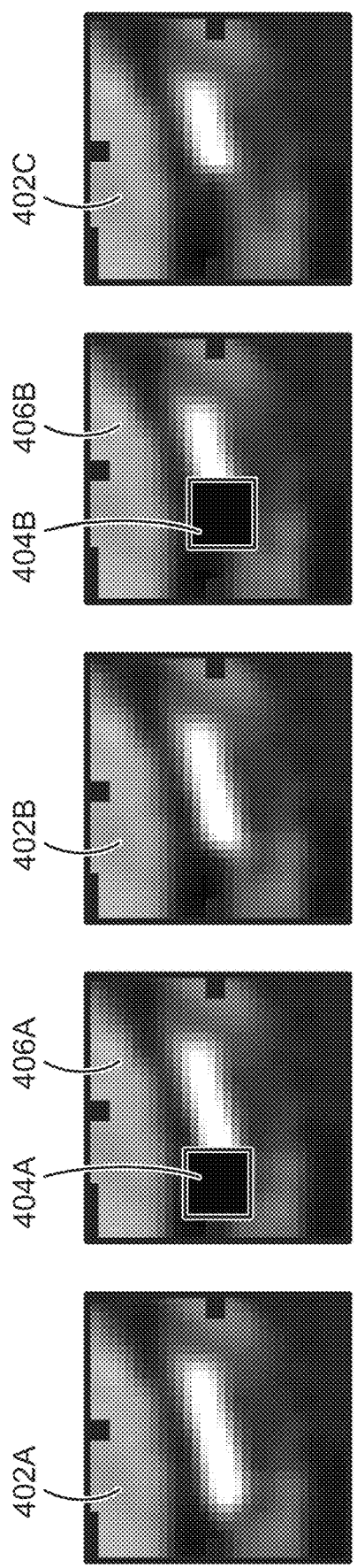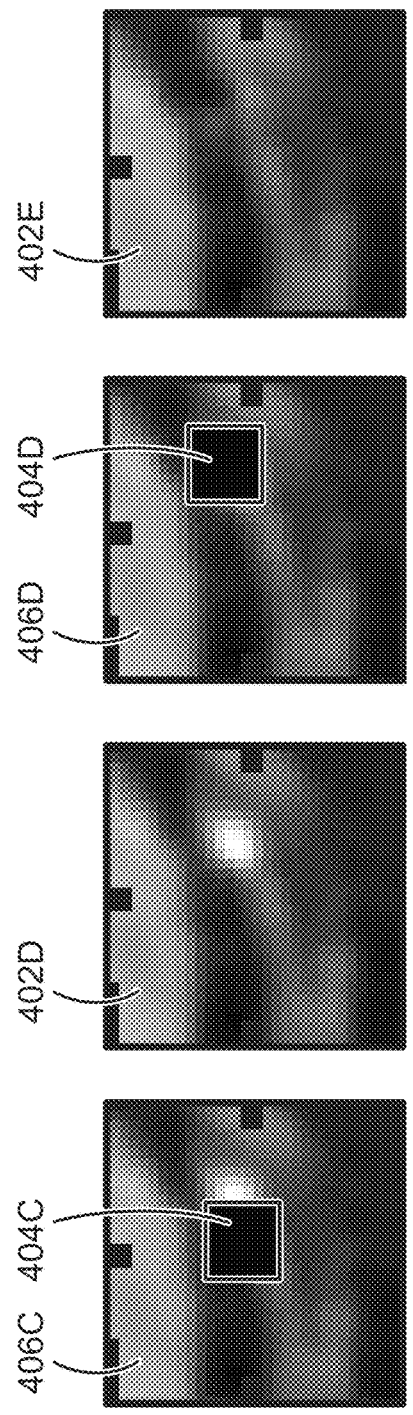

SYSTEMS AND METHODS FOR CALCIUM-FREE COMPUTED TOMOGRAPHY ANGIOGRAPHY

CROSS-REFERENCE TO RELATED APPLICATIONS

This application is a U.S. National Stage of International Application No. PCT/US2020/018678, filed Feb. 18, 2020, which claims priority to and the benefit of U.S. Provisional Patent Application No. 62/807,674, filed Feb. 19, 2019, each of which is hereby incorporated by reference herein in its entirety.

TECHNICAL FIELD

The present disclosure relates biomedical imaging and analysis. More specifically, the present disclosure relates to identifying and removing vascular calcification present in cardiac computed tomography angiography images in order to more accurately evaluate arterial lumen patency.

BACKGROUND

Computed tomography angiography allows for high resolution depiction of blood vessels in a patient's heart, such as cardiac arteries. However, a major limitation of this type of imaging is the presence of artifacts in the images due to calcium deposits in the patient's heart and/or blood vessels. These artifacts can make it difficult for healthcare practitioners to accurately analyze the images. Various methods exist remove the calcium artifacts from the image. In one example, two specific scans with proper registration are acquired, and a final image is generated through subtraction to remove the calcium artifacts. In another example, the calcium artifacts are removed via segmentation. However, these methods present difficulties in precisely identifying and removing the calcium artifacts. Thus, new systems and methods for removing calcium artifacts from computed tomography angiography images are needed.

SUMMARY

According to aspects of the present disclosure, a method of analyzing computed tomography (CT) images comprises receiving, by a processing device, an initial CT image of a portion of an object, the initial CT image showing one or more calcium deposits in the portion of the object and at least some of a target structure in the portion of the object; identifying, using the processing device, a calcified region in the initial CT image and one or more calcium-free regions in the initial CT image, the calcified region in the initial CT image showing the calcium deposits in the portion of the object; generating, using the processing device, a calcium-free image patch, the calcium-free image patch corresponding to the calcified region in the initial CT image; and apply, using the processing device, the calcium-free image patch to the initial CT image to produce a final CT image, the final CT image showing the calcium-free image patch and the calcium-free regions from the initial CT image.

According to aspects of the present disclosure, the method further comprises generating, using the processing device, an inpainting mask corresponding to the calcified region in the initial CT image; and applying the inpainting mask to the initial CT image to produce a modified CT image, the modified CT image showing the inpainting mask and the one or more calcium-free regions.

According to aspects of the present disclosure, a method of analyzing computed tomography (CT) images comprises receiving, by a processing device, a first CT image of a portion of an object, the first CT image showing one or more calcium deposits in the portion of the object; identifying, using the processing device, a calcified region in the first CT image and one or more calcium-free regions in the first CT image, the calcified region in the first CT image having a first portion and a second portion and showing the calcium deposits in the portion of the object; applying, using the processing device, a first inpainting mask to the first portion of the calcified region in the first CT image; generating, using the processing device, a first calcium-free image patch, the first calcium-free image patch corresponding to the first portion of calcified region in the first CT image; and applying, using the processing device, the first calcium-free image patch to the first CT image to produce a second CT image, the second CT image showing the first calcium-free image patch, the second portion of the calcified region from the first CT mage, and the one or more calcium-free regions from the first CT image; applying, using the processing device, a second inpainting mask to the second portion of the calcified region in the second CT image; generating, using the processing device, a second calcium-free image patch, the second calcium-free image patch corresponding to the second portion of calcified region in the second CT image; and applying, using the processing device, the second calcium-free image patch to the second CT image to produce a third CT image, the third CT image showing the first calcium-free image patch, the second calcium-free image patch, and the one or more calcium-free regions from the first CT image.

According to aspects of the present disclosure, a method of analyzing computed tomography (CT) images comprises receiving, by a processing device, an initial CT image of a portion of an object, the initial CT image showing one or more calcium deposits in the portion of the object and at least some of a target structure in the portion of the object; determining, using the processing device, whether a value of a property of each of a plurality of voxels in the initial CT image is greater than a threshold value, the value of the property of a respective voxel representing a value of a property of a material within the portion of the object being represented by the respective voxel, the value of the property of a respective voxel being greater than the threshold value indicating that the respective voxel represents calcium; identifying, using the processing device, a calcified region in the initial CT image and one or more calcium-free regions in the initial CT image based on the value of the property of the material represented by each of the plurality of voxels in the initial CT image, the calcified region in the initial CT image showing the calcium deposits in the portion of the object; generating, using the processing device, an inpainting mask corresponding to the calcified region in the initial CT image; applying the inpainting mask to the initial CT image to produce a modified CT image, the modified CT image showing the inpainting mask and the one or more calcium-free regions; and inputting the modified CT image into a neural network to produce a final CT image of the portion of the object, the neural network being configured to: generate, using the processing device, a calcium-free image patch, the calcium-free image patch corresponding to the calcified region in the initial CT image; and apply, using the processing device, the calcium-free image patch to the initial CT image to produce the final CT image, the final CT image showing the calcium-free image patch and the calcium-free regions from the initial CT image.

According to aspects of the present disclosure, a system for analyzing computed tomography (CT) images comprises a CT scanner including an x-ray source, an x-ray detector, and a processing device configured to generate a CT image based on signals received by the x-ray detector from the x-ray source; and a post-processing workstation, the post-processing workstation being configured to implement any of the methods disclosed herein.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 6A shows a first step of removing a calcium deposit from a CT image using a sliding windows technique;

FIG. 6B shows a second step of removing the calcium deposit from the CT image of FIG. 6A using the sliding windows technique;

FIG. 6C shows a third step of removing the calcium deposit from the CT image of FIG. 6A using the sliding windows technique;

FIG. 6D shows a fourth step of removing the calcium deposit from the CT image of FIG. 6A using the sliding windows technique;

FIG. 6E shows a fifth step of removing the calcium deposit from the CT image of FIG. 6A using the sliding windows technique;

FIG. 6F shows a sixth step of removing the calcium deposit from the CT image of FIG. 6A using the sliding windows technique;

FIG. 6G shows a seventh step of removing the calcium deposit from the CT image of FIG. 6A using the sliding windows technique;

FIG. 6H shows an eighth step of removing the calcium deposit from the CT image of FIG. 6A using the sliding windows technique;

FIG. 6I shows a ninth step of removing the calcium deposit from the CT image of FIG. 6A using the sliding windows technique;

Figure 1A:
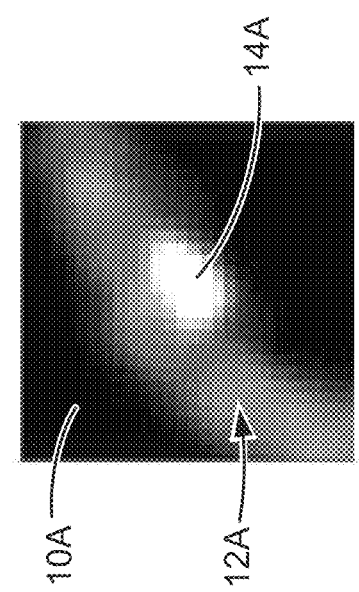
FIG. 1A shows a first example of a CT image showing an arterial lumen partially obscured by a calcium deposit.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments or implementations described herein.

Computed tomography-based imaging (CT imaging) is a technique used for imaging the human body that takes into account principles of x-ray attenuation. CT images are formed by directing x-ray signals toward a region of a human body and measuring the strength of the x-ray signals that are transmitted through the region of the patient. The type of material (for example, air, soft tissue, bone, calcium deposits) affects the strength of the transmitted x-rays. The varying strengths of the transmitted x-rays can be used to form the CT images. CT techniques can be used to image a patient's heart in CT angiography (CTA). These techniques can be used to diagnose and evaluate blood vessel diseases or related conditions, such as aneurysms or blockages.

Figure 2A:
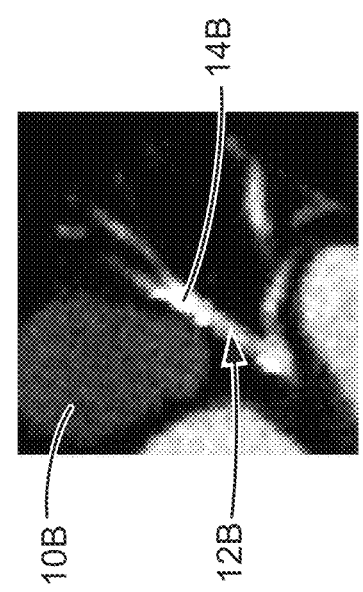
FIG. 2A shows a second example of a CT image showing an arterial lumen partially obscured by a calcium deposit.

FIGS. 1A and 2A show examples of original CT images 10A and 10B of an arterial lumen 12A, 12B of a patient. In both FIGS. 1A and 2A, the CT images 10A, 10B show the presence of calcium deposits 14A, 14B, in or near the region of the patient that is being imaged, e.g., in the patient's coronary arteries. This is known as coronary calcification. Calcium deposits in CT images can produce artifacts (such as x-ray hardening and blooming) that make it difficult for doctors or other healthcare professionals to accurately analyze the CT images. For example, the artifacts due to the calcium deposits 14A, 14B in CT images 10A, 10B, can obscure, block, or cast shadows on portions of the arterial lumen 12A, 12B. This can, for example, lead to significant overestimation of the severity of a cardiac disease, such as coronary artery disease. This can in turn lead to unnecessary catheterization and overtreatment.

Figure 1B:
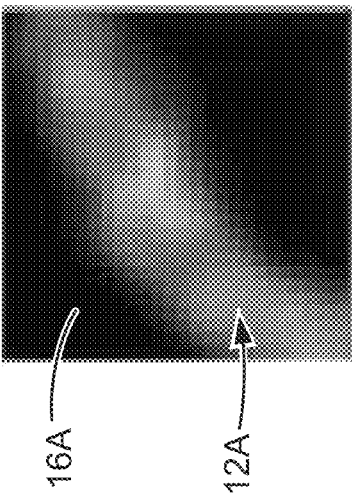
FIG. 1B shows a processed version of the CT image of FIG. 1A with the calcium deposit removed.
Figure 2B:
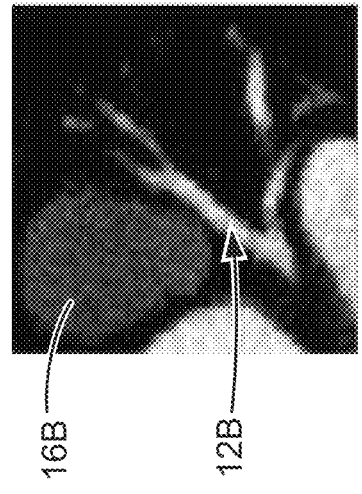
FIG. 2B shows a processed version of the CT image of FIG. 1B with the calcium deposit removed.

FIGS. 1B and 2B show processed versions 16A, 16B of the CT images 10A, 10B of FIGS. 1A and 2A, respectively, after the CT images 10A, 10B have been processed to remove the calcium deposits 14A, 14B and the associated artifacts. As can be seen, the removal of the calcium deposits 14A, 14B in the CT images 10A, 10B better shows the arterial lumen 12A, 12B, allowing doctors to more accurately diagnose any diseases or conditions the patient may have. Disclosed herein are various techniques for removing the artifacts from CT images caused by calcium deposits from CT images.

Figure 3:
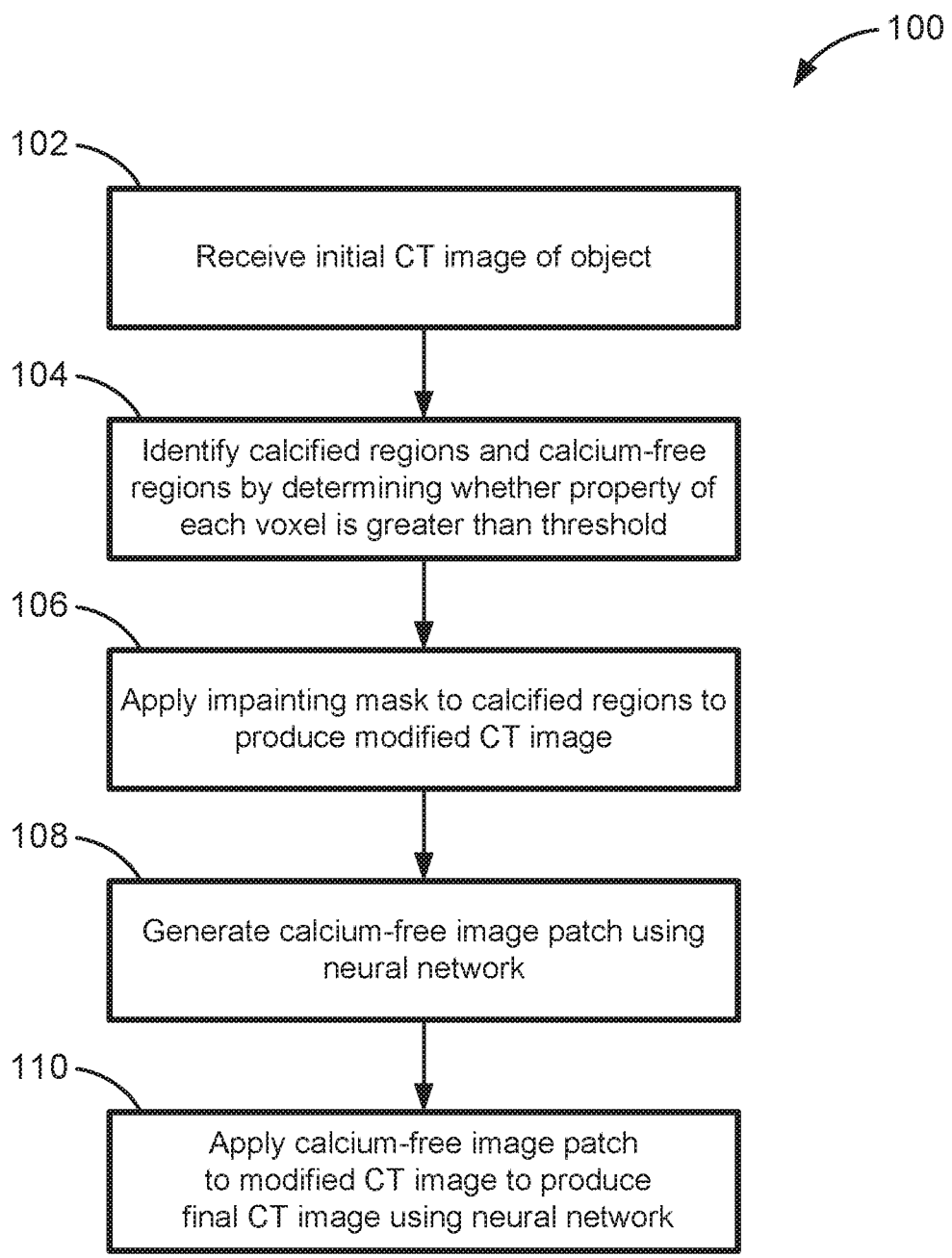
FIG. 3 shows a method for analyzing CT images to removed calcium deposits.
Figure 4C:
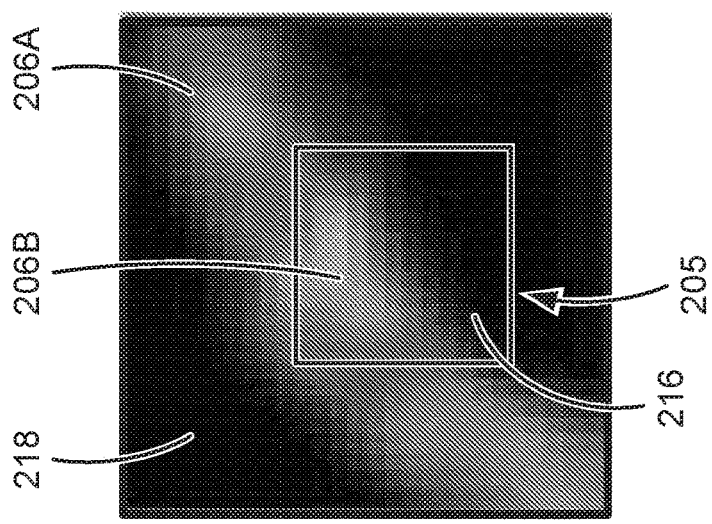
FIG. 4C shows the CT image of FIG. 4A with a calcium-free image patch applied over the inpainting mask of FIG. 4B.
Figure 4B:
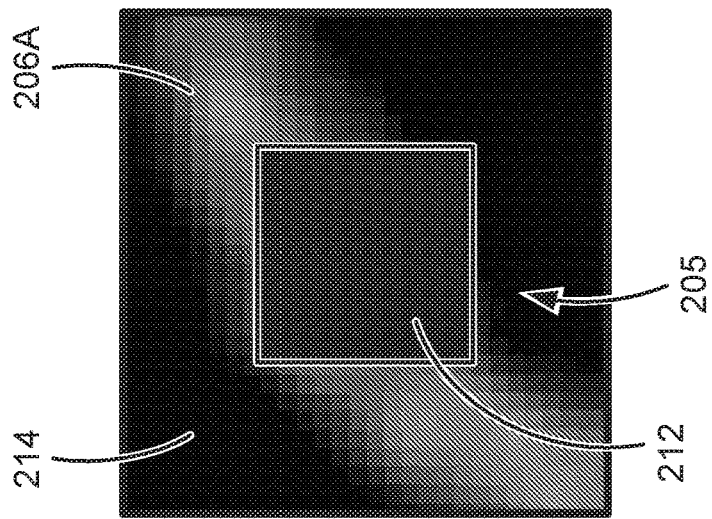
FIG. 4B shows the CT image of FIG. 4A with an inpainting mask applied to the calcified region.
Figure 4A:
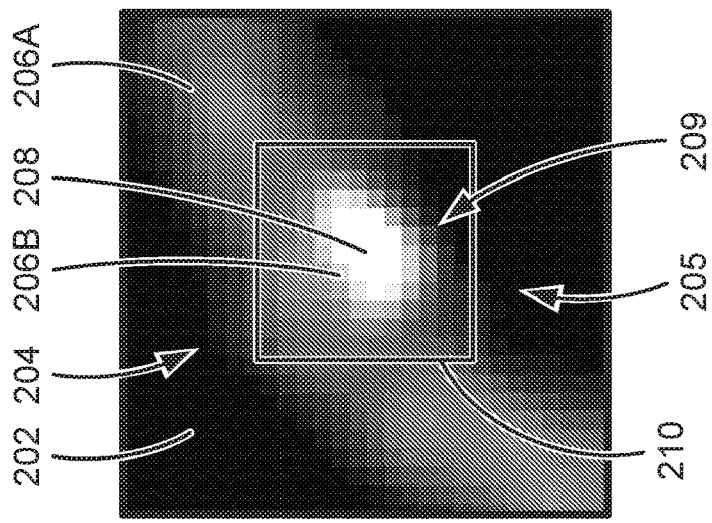
FIG. 4A shows a CT image of an arterial lumen with a calcified region outlined.

FIG. 3 illustrates a method 100 of analyzing a CT image to remove coronary calcification from the images, while FIGS. 4A-4C illustrate the CT image at various stages of method 100. At step 102, an initial CT image 202 (shown in FIG. 4A) is received by a processing device. The processing device can be part of the CT equipment used to obtain the initial CT image 202, or can be separate from the CT equipment. The initial CT image 202 shows a least a portion of an object that is being imaged. In some implementations, the object is a human being, and the initial CT image 202 shows various cardiac features of the human being. Generally human beings are imaged using CT techniques, although the techniques disclosed herein can be utilized when imaging non-human objects.

The initial CT image 202 will generally show a variety of different structures, such as bone, soft tissue, or various blood vessels. The initial CT image 202 also generally shows a structure that is being analyzed, referred to as a target structure. In the initial CT image 202, the target structure is an arterial lumen 204. A first portion 206A of the arterial lumen 204 is visible in the initial CT image 202, and a second portion 206B of the arterial lumen 204 is obscured or blocked by a calcium deposit 208. The second portion 206B of the arterial lumen 204 is generally adjacent and continuous with the first portion 206A. Thus, the initial CT image 202 will generally show the first portion 206A of the arterial lumen 204 with an acceptable level of quality, but the second portion 206B of the arterial lumen 204 is wholly or partially invisible in the initial CT image 202, or is obscured by the artifacts caused by the calcium deposit 208.

At step 104, one or more calcium-free regions 205 and one or more calcified regions 209 of the initial CT image 202 are identified using the processing device, as shown in FIG. 4A. The calcified region 209 in the initial CT image 202 is generally the portion of the initial CT image 202 where the calcium deposit 208 is visible. In some implementations, the border 210 of the calcified region 209 generally matches the border of the calcium deposit 208 that is visible in the initial CT image 202. In other implementations, the border 210 of the calcified region 209 can be slightly larger or smaller than the border of the calcium deposit 208 that is visible in the initial CT image 202.

Identification of the calcium-free regions 205 and the calcified regions 209 can be achieved by analyzing the properties of the voxels making up the initial CT image 202. While the initial CT image 202 can be two-dimensional (using pixels) or three-dimensional (using voxels), the term voxel is used herein to denote the individual elements of the initial CT image 202, whether they are two-dimensional or three-dimensional. Generally, however, the terms pixel and voxel can be used interchangeably herein.

As noted above, CT images are formed by measuring the strength of x-ray signals that propagate through the various materials making up the region of the patient that is being imaged. The strength of the x-ray signals (or the amount of attenuation the signals experience relative to their initial strength) is indicative of the radiodensity of the material that the x-rays travel through. The radiodensity of the different materials can be measured on the Hounsfield scale using Hounsfield units (HU). The radiodensity of the different materials is then encoded into each voxel according to which material the voxel represents. In some implementations, the radiodensity is encoded as the brightness of the voxel on a grayscale. Materials having a higher radiodensity can be displayed using bright voxels (e.g., they tend towards the white portion of the grayscale), while materials having a lower radiodensity can be displaying using dim voxels (e.g., they tend towards the black portion of the grayscale).

Thus, by measuring a property of the voxels (e.g. brightness), a property of the material being represented by the voxels (e.g. radiodensity) can be determined. Voxels in the calcified regions are identified as having a radiodensity above a threshold value on the Hounsfield scale. In some implementations, this threshold is about 700 HU. In other implementations, this threshold is between about 600 HU and about 800 HU. In some implementations, properties other than the brightness of the voxels are measured, and properties of the materials other than the radiodensity are used to determine which material each voxel represents. In some implementations, a probability map of the initial CT image is generated that indicates a probability that each individual voxel in the initial CT image represents calcium.

At step 106, an inpainting mask 212 is applied to the calcified region 209 in the initial CT image 202 to produce a modified CT image 214, as shown in FIG. 4B. The modified CT image 214 generally shows the inpainting mask 212 and any calcium-free regions 205 that were present in the initial CT image 202. In one implementation, the inpainting mask 212 is applied by modifying the brightness of any voxel that was determined to represent calcium. For example, the brightness of any voxels representing calcium within the calcified region 209 can be modified so those voxels appear as black. In addition, voxels within close proximity to the identified calcified region 209 are also part of the inpainting mask 212, and are thus also shown as black. In the modified CT image 214, the first portion 206A of the arterial lumen 204 is visible, while the second portion 206 of the arterial lumen 204 is masked by the inpainting mask 212. Other types of modifications to the calcium voxels can also be used. Thus, as shown by comparing FIGS. 4A and 4B, the size of the inpainting mask 212 that is applied to the initial CT image 202 (FIG. 4B) can be larger than the size of the calcium deposit 208 (FIG. 4A). In other implementations, the size of the inpainting mask 212 may match the size of the calcium deposit 208.

At step 108 of method 100, the modified CT image 214 can be input into a neural network. The neural network is configured to generate or synthesize calcium-free image patches 216 from the inpainting mask 212 and the surrounding calcium-free regions 205. Each calcium-free image patch 216 corresponds to one of the identified calcified regions 209, and shows any part of the initial CT image 202 that was obscured or blocked by a calcium deposit artifact. The neural network is trained to generate the calcium-free image patches 216 based on a training image set, which can be used to adjust the weights of the various layers of the neural network. The training image set includes one or more CT images that do not contain any calcified regions. In some implementations, the CT images in the training image set are similar to CT images that the neural network is configured to process, such as CT images showing arterial lumen. The neural network is able to generate or synthesize the calcium-free image patches using the surrounding anatomical context from the calcium-free regions.

At step 110, the calcium-free image patches are applied to the modified CT image 214 to produce a final CT image 218, which is illustrated in FIG. 4C. Specifically, the inpainting mask 212 of FIG. 4B is replaced by the calcium-free image patches 216, such that the final CT image 218 shows the same structures as the initial CT image 202, but the previously obscured or blocked features are now visible. The calcified regions 209 from the initial CT image 202 are not visible. Any structure that was obscured or blocked by the calcium deposits in the initial CT image 202 is shown clear of calcium deposits in the final CT image 218. Thus, the final CT image 218 can show both the first portion 206A of the arterial lumen 204 that was visible in the initial CT image 202, as well as the second portion 206B of the arterial lumen 204 that was obscured or blocked by the calcium deposits 208 in the initial CT image 202. The second portion 206B of the arterial lumen 204 is shown in the final CT image 218 as being adjacent to and continuous with the first portion 206A of the arterial lumen 204.

With respect to FIGS. 4A-4C, the border 210 that is visible in the CT images 202, 214, and 218 may not actually be produced and displayed on a display device. Moreover, the modified CT image 214 in FIG. 4B may also not actually be produced and displayed on a display device. However, image data representing the images 202, 214, 218 with the border 210 can be generated or created, and image data representing the modified CT image 214 can be generated or created. Indeed, even the initial CT image 202 and the final CT image 218 may never actually be reproduced as images on a display device, but rather may exist only as image data. Thus, any references herein to an image may generally be referring to image data that can be reproduced as the image on a display device, even if the image is not ever actually reproduced and displayed on a display device.

Figure 5:
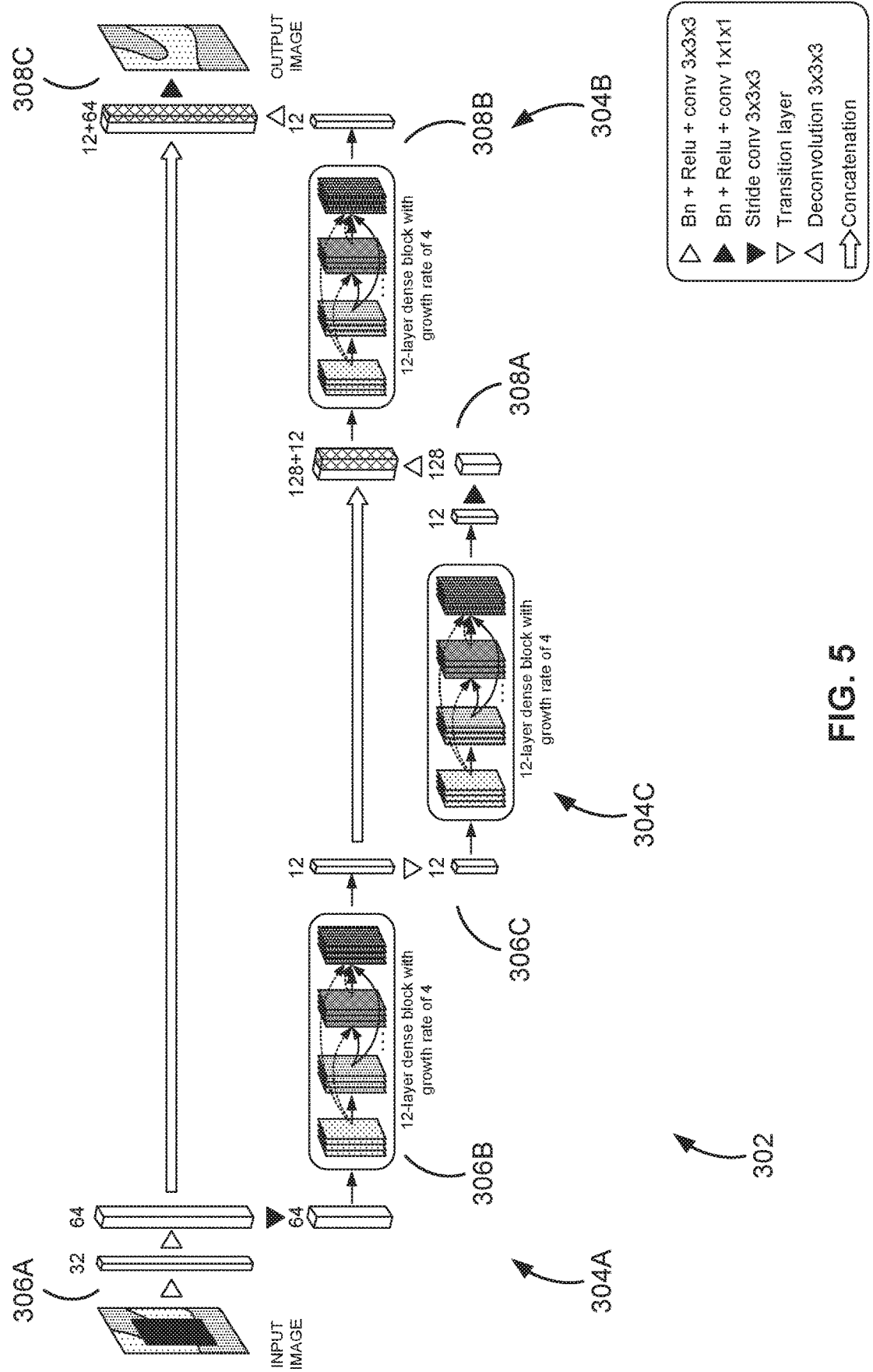
FIG. 5 shows a convolution neural network configured to remove calcium deposits from CT images by generating and applying calcium-free image patches to the CT images.

Referring now to FIG. 5, a neural network 302 according to some implementations is shown. The neural network 302 can be configured to process both two-dimensional and three-dimensional images. The neural network 302 can be a convolutional neural network that includes both a contracting path 304A and an expanding path 304B, as well as a transition stage 304C between the contracting path 304A and the expanding path 304B. Within the contracting path 304A, the neural network 302 processes the modified CT image 214 to hierarchically extract features from the calcium-free regions 205 of the modified CT image 214. The contracting path 304A progressively reduces the amount of spatial information in the modified CT image 214 and increases the amount of feature information in the modified CT image 214. The end result of the contracting path 304A is a down-sampled CT image as compared to the modified CT image 214.

Once a sufficient quantity of image features is extracted, the expanding path 304B progressively restores the spatial details based on the extracted features, and eventually produces the final CT image 218. The final CT image 218 is an up-sampled image as compared to the CT image existing at the end of the contracting path 304A. The expanding path 304B thus combines the feature information obtained during the contracting path 304A with the spatial information that was discarded. The calcium-free image patches 216 are then merged with the calcium-free regions 205 of the modified CT image 214 to form the final CT image 218.

The contracting path 304A includes a series of stages that break down the modified CT image to extract details and features from the anatomical context of the modified CT image. The anatomical context utilized in the contracting path 304A may come from the calcium-free regions 205, the calcified regions 209, or any combination thereof. The contracting path 304A includes a variety of stages with different layers that apply different transformations to the modified CT image 214 and successive data. The modified CT image 214 is input into a first stage 306A of the contracting path 304A, which generally includes one or more 3×3×3 convolution layers. Each of these convolution layers may also include a batch normalization (BN) operation and a rectified linear unit (ReLU) operation. This initial 3×3×3 convolution layer acts as an image feature extractor. With the non-linear activation of the ReLU operation, the 3×3×3 convolution layer transforms the voxels of the modified CT image into high-dimensional image feature maps, which can be further utilized by other layers in the neural network 302.

While the input into the first stage 306A of the contracting path 304A (the modified CT image 214) generally only includes a single feature channel, the convolution layers within the first stage 306A of the contracting path 304A increase the number of feature channels to sixty-four so as to increase the feature information available for processing. Thus, the first stage 306A of the contracting path 304A provides a modified representation of the input image (the modified CT image 214 with the inpainting mask 212) with a larger amount of feature information available.

A second stage 306B of the contracting path 304A includes a max pooling layer (also known as a stride 3×3×3 convolution layer) and a dense contracting block. The second stage 306B of the contracting path 304A takes as input the final output of the first stage 306A of the contracting path 304A. The max pooling layer serves to discard some of the spatial information within the modified representation of the input image. Thus, the output of the max pooling layer includes image data that still has sixty-four feature channels, but represents less spatial information, e.g., represents a smaller region of the input image. In some implementations, the dense contracting block is a 12-layer dense block with a growth rate of 4. The dense contracting block extracts feature information and produces a representation of the input image with twelve feature channels.

Each dense block includes several convolution layers that are densely connected to each other by continuously stacking feature maps from the previous layers. The dense blocks utilize skip connections between layers. Thus, the $n^{th}$ layer of one of the dense blocks is connected to both the $(n+1)^{th}$ layer and at least one subsequent layer. This provides superior performance as compared to neural networks without dense blocks. First, during the training, the image information that is used to update the weights of the neural network 302 can flow more smoothly through different layers, which enables efficient training. Second, the individual layers are shared within the dense block, which reduces the number of parameters in the network, thereby reducing overfit in the training step. Third, the reduction in network size enabled by the dense block can help to reduce the memory requirement of the neural network 302 and improve computation efficiency.

Finally, the output of the second stage 306B of the contracting path 304A is input into a third stage 306C, which includes a transition layer with a BN operation, an ReLU operation, and a 3×3×3 convolution layer. The third stage 306C of the contracting path 304A reduces spatial information being processed by discarding some of the spatial information that is input into the third stage 306C. The third stage 306C of the contracting path 304A maintains the number of individual feature channels.

The output of the third stage 306C of the contracting path 304A is then input into the transition stage 304C, which includes a dense transition block. The dense transition block can be a 12-layer dense block with a growth rate of 4.

The output of the transition stage 304C is input into a first stage 308A of the expanding path 304B. The first stage 308A of the expanding path 304B includes one or more 1×1×1 convolution layers and one or more 3×3×3 deconvolution layers. The 1×1×1 convolution layers are configured to reduce the number of feature channels and decrease the complexity of the network, therefore reducing the computational resources. The 3×3×3 deconvolution layers are configured to then restore the lost spatial resolution from the 1×1×1 convolution layers. The first stage 308A of the expanding path 304B increases the feature channels from twelve to one hundred twenty-eight.

The output of the first stage 308A of the expanding path 304B (with one hundred twenty-eight feature channels) is concatenated with the output of the second stage 306B of the contracting path 304A (with twelve feature channels) to produce data having one hundred forty feature channels. This data is input into the second stage 308B of the expanding path 304B. Thus, the spatial information that was discarded at the second stage 306B of the contracting path 304A is utilized with the increased amount of feature information that is produced at the end of the contracting path 304A. The second stage 308B of the expanding path 304B includes a dense expanding block and one or more 3×3×3 deconvolution layers and reduces the number of feature channels from one hundred twenty-eight feature channels to twelve feature channels.

Finally, the output of the second stage 308B of the expanding path 304B (with twelve feature channels) is concatenated with the output of the first stage 306A of the contracting path 304A (with sixty-four feature channels) and input into the third stage 308C of the expanding path 304B. Thus, the spatial information discarded after the first stage 306A of the contracting path 304A is combined with the increased feature information obtained during the contracting path 304A. The third stage 308C of the expanding path 304B includes one or more 1×1×1 convolution layers that produce the final CT image 218. Generally, all of the convolution layers are padded and the final CT image 218 is the same size as the modified CT image 214 that serves as the input image to the neural network 302.

In some implementations, the neural network 302 is trained using a number of training images that have no calcified regions. It is generally very difficult to obtain CT images of calcified regions that do not have any artifacts caused by the calcium deposits. As such, it is generally not feasible to train the neural network 302 with pairs of contaminated and artifact-free images that show the same region of the patient. However, because portions of the structures shown in the image generally have the same properties as adjacent portions obscured or blocked by the artifacts, calcium-free images having no artifacts can be used to train the neural network 302. The neural network 302 generates image patches to regions of the artifact-free images designated as calcified regions, even though those regions do not actually show any artifacts caused by calcium deposits. The final CT images produced by the neural network 302 (and specifically the regions of the final CT images generated by the neural network 302) can be compared to the artifact-free training images to train the neural network 302. Generally, the designated calcified regions (and thus the applied inpainting masks) are in the center of the training images. During training, the inpainting masks will generally all be the same size, although the neural network 302 can be trained using inpainting masks of different sizes. In one implementation, the initial learning rate of the neural network 302 is $1e^{-4}$ with a batch size of three. In this implementation, a total of 70,000 training steps was used to train the neural network 302.

Referring now to FIGS. 6A-6I, there is generally a maximum inpainting mask size that can work with the neural network 302 due to memory limitations. However, the calcified regions of CT images of many patients are irregular, and can include thin elongated calcified segments that extend beyond the maximum boundary of the inpainting mask. In order to effectively remove the elongated portions of the calcified regions of these CT images, a sliding windows technique can be used on the initial CT images, as shown in FIGS. 6A-6I.

FIG. 6A illustrates an initial CT image 402A of a region of the patient. As shown in FIG. 6B, a first inpainting mask 404A is applied to the initial CT image 402A to produce a first modified CT image 406A. The first inpainting mask 404A is applied over a first portion of the calcified region. The first inpainting mask 404A is generally smaller than the maximum size of the inpainting mask and/or the calcified region. This first modified CT image 406A is input into the neural network 302, which creates a first intermediate CT image 402B (FIG. 6C), where the artifacts from the first portion of the calcified region are removed. A second inpainting mask 404B is then applied to a second portion of the calcified region of the first intermediate CT image 402B to form a second modified CT image 406B (FIG. 6D). The neural network 302 then removes the artifacts from the second portion of the calcified region of the second modified CT image 406B to form a second intermediate CT image 402C (FIG. 6E).

Third and fourth inpainting masks 404C, 404D can be applied to third and fourth portions of the calcified region (FIGS. 6F and 6H) to remove the artifacts from those portions of the calcified region (FIGS. 6G and 6I). A third intermediate CT image 402D (FIG. 6G) is produced after the neural network 302 processes the third modified CT image 406C with the third inpainting mask 404C applied. A final CT image 402E (FIG. 6I) is produced after the neural network 302 processes the fourth modified CT image 406D with the fourth inpainting mask 404C applied. Because the calcified region from the initial CT image 402A (FIG. 6A) only needed four inpainting masks, the fourth intermediate CT image 402E is considered the final CT image that shows all of the target structure within the imaged portion of the patient. However, depending on the size of the calcified region and the characteristics of the hardware that the processing is being performed by, more than or less than four inpainting masks can be used to produce the final CT image.

This sliding windows technique is generally more robust and efficient than techniques using larger size inpainting masks, as the larger size inpainting masks often only correct for small portions of the calcified region each time the neural network 302 is used. The sliding windows technique preserves more anatomical context than other methods. Moreover, the sliding windows technique is generally more flexible and can handle irregularly-shaped calcified regions. As can be seen in FIGS. 6A-6I, the inpainting mask can generally be applied to any region of the initial CT image where the artifacts due to calcium deposits occur.

The sliding windows technique demonstrated herein can generally be used with any size calcified region in the initial CT image. For example, the size of the calcified region may only require two different inpainting masks to be applied over two different ends of the calcified regions. In another example, any number of individual inpainting masks are used, with each subsequent inpainting masks being applied to an adjacent portion of the calcified region. In still other examples, subsequent inpainting masks are applied to non-adjacent portions of the calcified region.

Figure 7A:
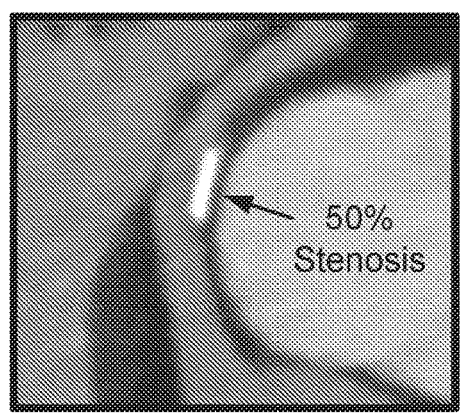
FIG. 7A shows an initial CT image of an arterial lumen indicating a significant degree of stenosis due to the presence of a calcium deposit.
Figure 7B:
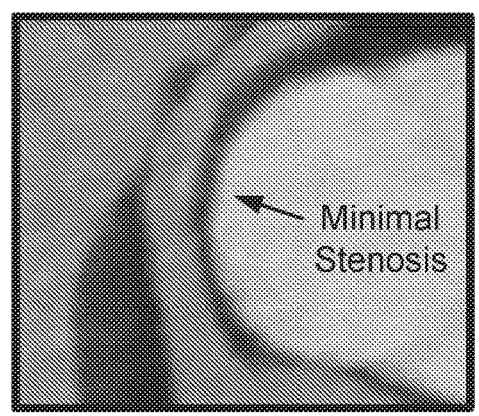
FIG. 7B shows a processed CT image of the arterial lumen of FIG. 7B indicating a minimal degree of stenosis after removal of the calcium deposit from the initial CT image.
Figure 7C:
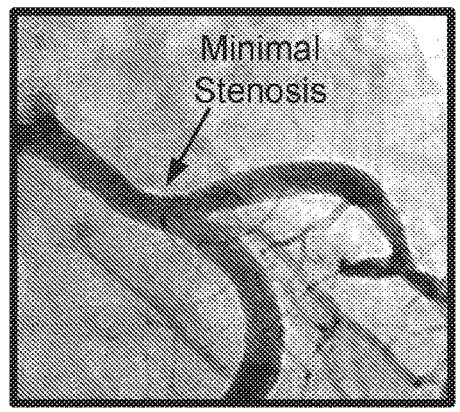
FIG. 7C shows a traditional x-ray angiography image of the arterial lumen of FIG. 7A confirming the minimal degree off stenosis.

FIGS. 7A-7D illustrate the effectiveness of the techniques disclosed herein in analyzing arterial lumen using CT angiography. FIG. 7A shows an initial CT image of a cardiac artery of a patient. Due to the calcification, the cardiac artery appears to have at least 50% stenosis. Processing the image in FIG. 7A with the techniques disclosed herein results in the final CT image shown in FIG. 7B. The artifacts due to the calcification have been removed, showing that the cardiac artery has minimal stenosis, instead of the 50% stenosis indicated by the initial CT image. This finding is confirmed by FIG. 7C, which shows an image produced by traditional x-ray angiography. As shown, this image also indicates minimal stenosis in the cardiac artery.

Figure 7D:
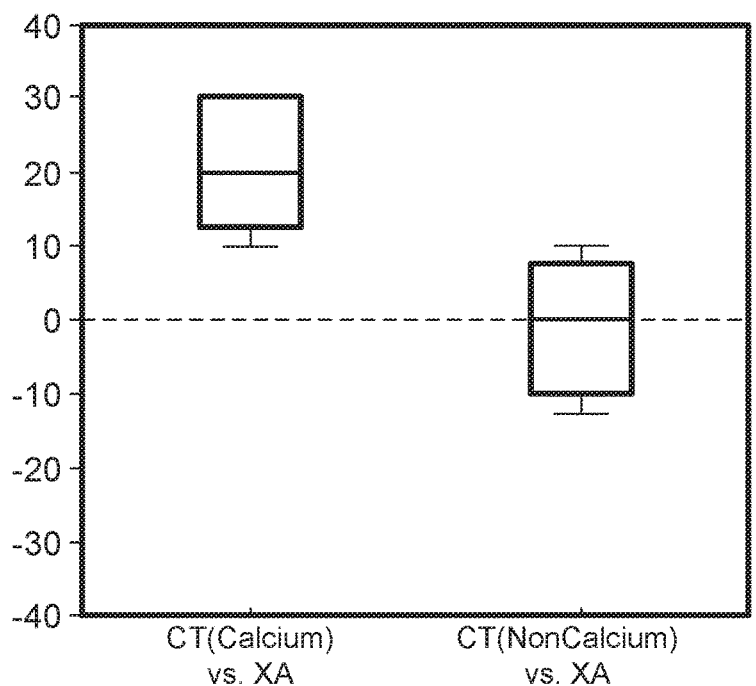
FIG. 7D shows a boxplot comparing stenosis measurements between (i) a standard CT image and x-ray angiography, and (ii) a standard CT image processed according to the techniques herein and x-ray angiography.

FIG. 7D shows a boxplot based on a validation dataset comparing the absolute differences in degree of stenosis measurements between (i) a standard CT image and x-ray angiography, and (ii) a standard CT image processed according to the techniques herein and x-ray angiography. As shown, the unprocessed CT image overestimates stenosis, while the processed CT image does not.

Figure 8C:
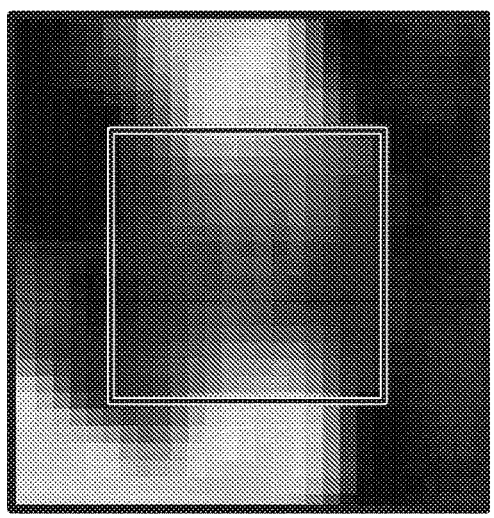
FIG. 8C shows a final CT image where the calcium deposit of FIG. 8A was removed using autoencoders.
Figure 8F:
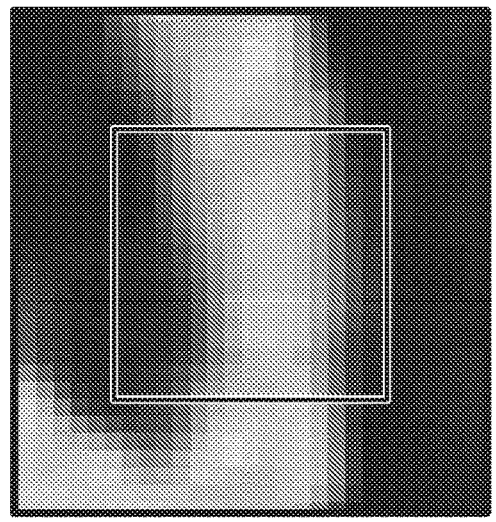
FIG. 8F shows a final CT image where the calcium deposit of FIG. 8A was removed using a convolutional neural network.
Figure 8B:
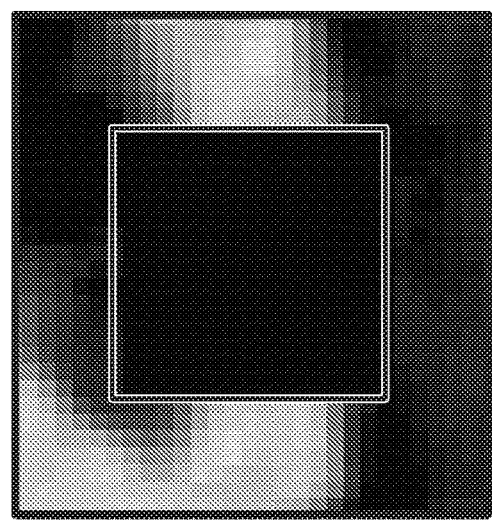
FIG. 8B shows the CT image of FIG. 8A with an inpainting mask applied.
Figure 8E:
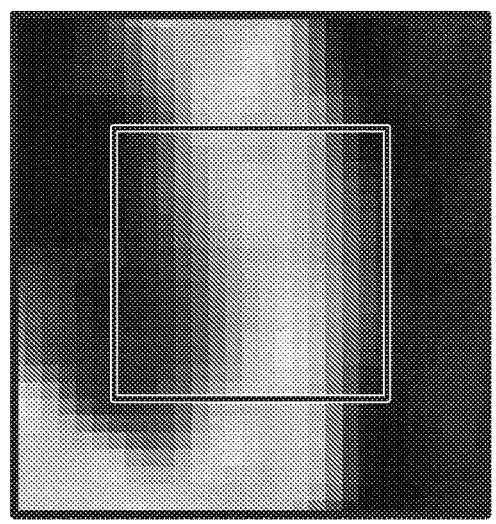
FIG. 8E shows a final CT image where the calcium deposit of FIG. 8A was removed using a U-net neural network.
Figure 8A:
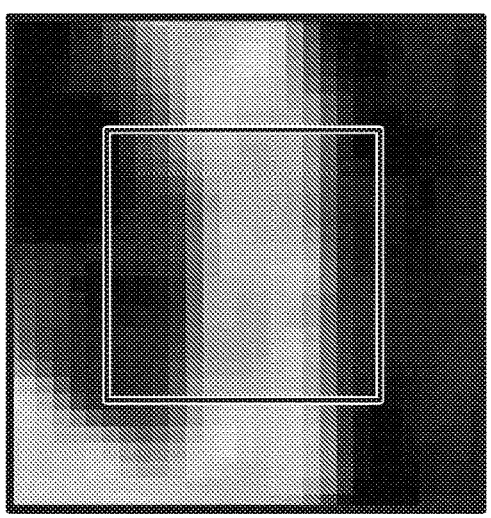
FIG. 8A shows an original CT image showing an arterial lumen with a calcium deposit.
Figure 8D:
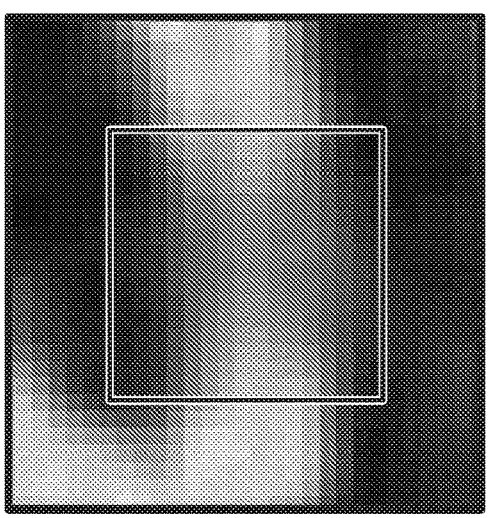
FIG. 8D shows a final CT image where the calcium deposit of FIG. 8A was removed using a Densenet neural network.
Figure 8G:
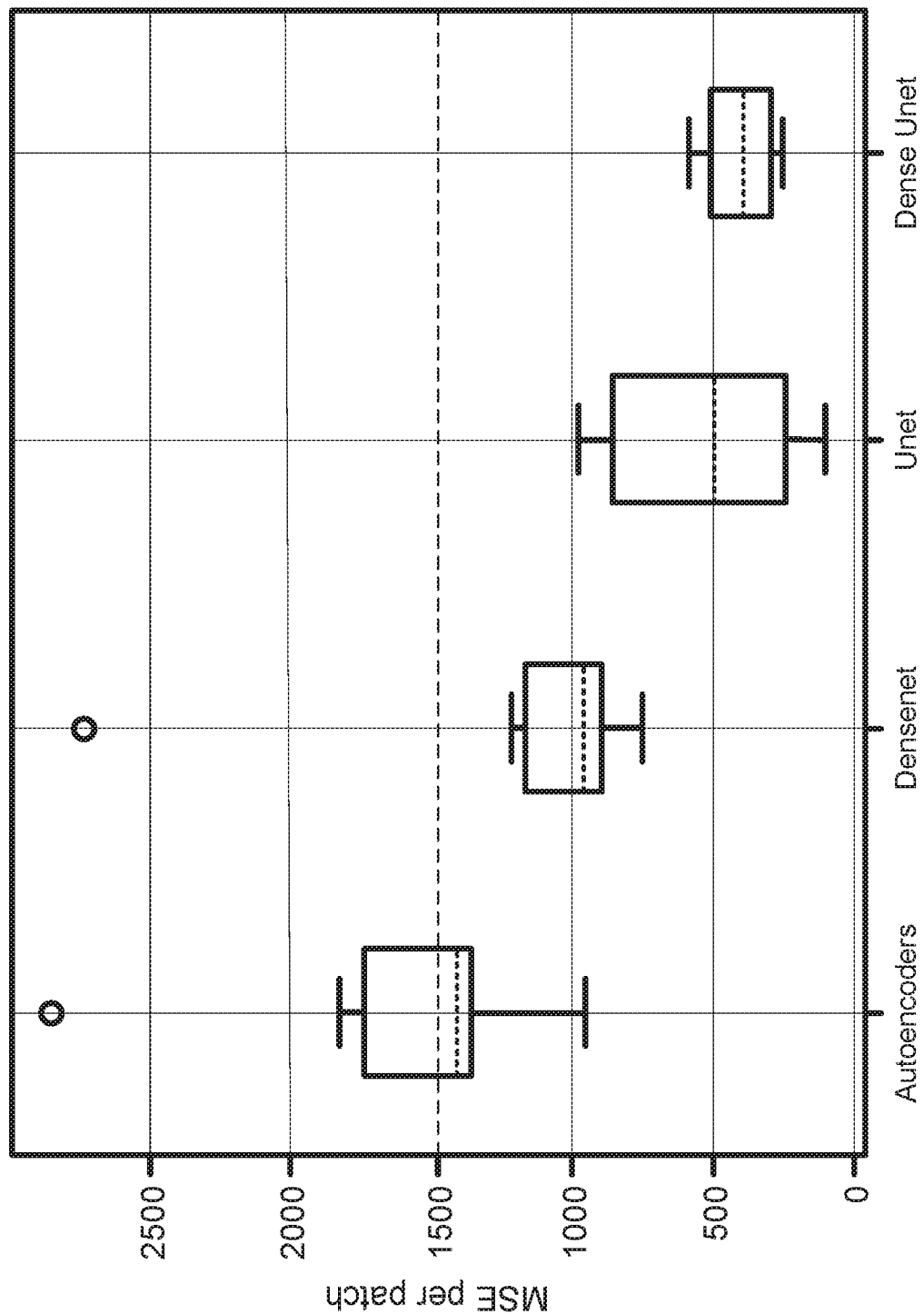
FIG. 8G shows a plot of the mean square error per calcium-free image patch for each of the methods shown in FIGS. 8C-8F.

FIGS. 8A-8G illustrate the effectiveness of various methods for performing the inpainting task, and show the superiority of the techniques disclosed herein. FIG. 8A shows an original CT image showing an arterial lumen with a calcium deposit. FIG. 8B shows the CT image of FIG. 8A with the inpainting mask applied. FIG. 8C illustrates a final CT image that was obtained using autoencoders, which results in a visible gap in the center of the arterial lumen. FIG. 8D illustrates a final CT image that was obtained using a Densenet neural network. FIG. 8E illustrates a final CT image that was obtained using a U-net neural network. Finally, FIG. 8F illustrates a final CT image that was obtained using the techniques disclosed herein, including the neural network 302 illustrated in FIG. 5. As shown, the final CT image using the disclosed neural network 302 generally produces a final CT image that most effectively restores the arterial lumen. FIG. 8G shows the mean square error (MSE) per calcium-free image patch for each method. As shown, the MSE per calcium-free image patch for the techniques disclosed herein is the smallest.

Aspects of the present disclosure can be implemented using a variety of hardware. Generally, the initial CT images can be obtained using standard CT hardware, which can include an x-ray source, an x-ray detector, and a rotation mechanism for rotating the x-ray source and the x-ray detector around the object being imaged. Image data is generated from the x-ray signals received by the x-ray detector, and the initial CT images can be formed. The images can be processed according to the techniques disclosed herein using any suitable processing device. In some implementations, the standard CT hardware generates the initial CT images, which are then transferred to a separate post-processing workstation. In other implementations, a processing device that is part of the CT hardware can perform the post-processing. In some implementations, the neural network 302 implemented on the processing device is implemented in a deep learning Python environment using the Tensorflow platform. The processing device that the neural network 302 is implemented on can be the central processing unit (CPU) of a standard computer, or may be a dedicated graphics processing unit (GPU).

In some implementations, a non-transitory, machine-readable medium has instructions stored thereon for implementing any of any of the methods or processes discussed herein. A machine processor is configured to executed the instructions in order to perform these methods or processes.

Aspects of the present disclosure can be implemented on a variety of types of processing devices, such as general purpose computer systems, microprocessors, digital signal processors, micro-controllers, application specific integrated circuits (ASICs), programmable logic devices (PLDs) field programmable logic devices (FPLDs), programmable gate arrays (PGAs), field programmable gate arrays (FPGAs), mobile devices such as mobile telephones, personal digital assistants (PDAs), or tablet computers, local servers, remote servers, wearable computers, or the like.

Memory storage devices of the one or more processing devices can include a machine-readable medium on which is stored one or more sets of instructions (e.g., software) embodying any one or more of the methodologies or functions described herein. The instructions can further be transmitted or received over a network via a network transmitter receiver. While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various embodiments or implementations, or that is capable of storing, encoding, or carrying data structures utilized by or associated with such a set of instructions. The term "machine-readable medium" can accordingly be taken to include, but not be limited to, solid-state memories, optical media, and magnetic media. A variety of different types of memory storage devices, such as a random access memory (RAM) or a read only memory (ROM) in the system or a floppy disk, hard disk, CD ROM, DVD ROM, flash, or other computer readable medium that is read from and/or written to by a magnetic, optical, or other reading and/or writing system that is coupled to the processing device, can be used for the memory or memories.

While aspects of the present disclosure have been described with reference to one or more particular implementations, those skilled in the art will recognize that many changes may be made thereto without departing from the spirit and scope of the present disclosure. Each of these implementations and obvious variations thereof are contemplated as falling within the spirit and scope of the present disclosure. It is also contemplated that additional implementations according to aspects of the present disclosure may combine any number of features from any of the implementations described herein.

REFERENCES

The following documents are provided to explain various aspects of the present invention. Their contents of each is hereby incorporated by reference herein in its entirety.

1. G. Bastarrika, Y. S. Lee, W. Huda, B. Ruzsics, P. Costello, and U. J. Schoepf, "CT of coronary artery disease," *Radiology*, 2009.
2. M. Dewey, "Coronary CT versus MR angiography: pro CT—the role of CT angiography," *Radiology*, 2011.
3. K. Yoshioka, R. Tanaka, and K. Muranaka, "Subtraction coronary CT angiography for calcified lesions," *Cardiology Clinics*, 2012.
4. A. Criminisi, P. Perez, and K. Toyoma, "Object removal by exemplar-based inpainting," *CVPR*, 2003.
5. D. Pathak, P. Krahenbuhl, J. Donahue, T. Darrell, and A. A Efros, "Context encoders: Feature learning by inpainting," *CVPR*, 2016.
6. S. Shivaranjani, and R. Priyadharsini, "A survey on inpainting techniques," *Electrical, Electronics, and Optimization Techniques (ICEEOT), International Conference on IEEE*, 2016.
7. A. Krizhevsky, I. Sutskever, G. E. Hinton, "Imagenet classification with deep convolutional neural network," *NIPS*, 2012.
8. Y. Bengio, "Learning deep architectures for AI," *Foundations and trends in Machine Learning*, 2009.
9. O. Ronneberger, P. Fischer, and T. Brox, "U-net: convolutional networks for biomedical image segmentation," *MICCAI*, 2015.
10. O. Cicek, A. Abdulkadir, S. S. Lienkamp, T. Brox, and O. Ronneberger, "3D U-Net: Learning dense volumetric segmentation from sparse annotation," *MICCAI*, 2016.
11. G. Huang, Z. Liu, and K. Q. Weinberger, "Densely connected convolutional networks, *CoRR*, 2016.
12. M. Abadi, "TensorFlow: learning functions at scale," *ACM SIGPLAN Notices*, 2016.
13. D. Dey, T. Schepis, M. Marwan, P. J. Slomka, D. S. Berman, S. Achenbach, "Automated three-dimensional quantification of noncalcified coronary plaque from coronary CT angiography: comparison with intravascular US," *Radiology*, 2010.

What is claimed is:

1. A method of analyzing computed tomography (CT) images, comprising:
receiving, by a processing device, an initial CT image of a portion of an object, the initial CT image showing one or more calcium deposits in the portion of the object and at least some of a target structure in the portion of the object;
identifying, using the processing device, a calcified region in the initial CT image and one or more calcium-free regions in the initial CT image, the calcified region in the initial CT image showing the calcium deposits in the portion of the object;
applying an inpainting mask corresponding to the calcified region in the initial CT image to the initial CT image to produce a modified CT image, the modified CT image showing the inpainting mask and the one or more calcium-free regions;
inputting the modified CT image into a neural network that is trained to:
generate a calcium-free image patch from the inpainting mask in the modified CT image, the calcium-free image patch corresponding to the calcified region in the initial CT image; and
apply the calcium-free image patch to modified CT image to produce a final CT image, the final CT image showing the calcium-free image patch and the calcium-free regions from the initial CT image; and
receiving the final CT image from the neural network, wherein:
the neural network is convolutional neural network that includes a contracting path, an expanding path, and a transition stage between the contracting path and the expanding path, the contracting path being configured to hierarchically extract features of the one or more calcium-free regions from the modified CT image, the expanding path being configured generate the calcium-free image patch from the extracted features and merge the calcium-free image patch with the calcium-free regions;
the expanding path includes:
(i) a first stage with one or more 1×1×1 convolution layers and one or more 3×3×3 deconvolution layers;
(ii) a second stage with a dense expanding block, and one or more 3×3×3 deconvolution layers;
and (iii) a third stage with one or more 1×1×1 convolution layers; and
the output of the transition stage is input into the first stage of the expanding path, the output of the first stage of the expanding path is input into the second stage of the expanding path, the output of the second stage of the expanding path is input into the third stage of the expanding path, and the output of the third stage of the expanding path is the final CT image.

2. The method of claim 1, wherein the target structure includes at least a first portion and a second portion, the second portion being adjacent to and continuous with the first portion.

3. The method of claim 2, wherein one of the one or more calcium-free regions shows the first portion of the target structure, and wherein the calcified region is adjacent to the one calcium-free region showing the first portion and does not show the adjacent second portion of the target structure, such that the second portion of the target structure is obscured or is not visible in the initial CT image.

4. The method of claim 3, wherein the generated calcium-free image patch shows the second portion of the target structure such that the final CT image shows the second portion of the target structure adjacent to and continuous with the first portion of the target structure.

5. The method of claim 1, further comprising determining whether a value of a property of each of a plurality of voxels in the initial CT image is greater than a threshold value, the value of the property of a respective voxel representing a value of a property of a material within the portion of the object being represented by the respective voxel.

6. The method of claim 5, wherein the value of the property of the material being represented by the respective voxel is indicative of the type of material being represented by the respective voxel.

7. The method of claim 6, wherein the value of the property of the respective voxel being greater than the threshold value indicates that the respective voxel represents calcium.

8. The method of claim 5, wherein the property of the material is a radiodensity of the material measured in Hounsfield units (HU), and wherein the threshold value of the property of the material is 700 HU.

9. The method of claim 5, wherein the property of each respective voxel is a brightness of each respective voxel on a gray scale.

10. The method of claim 1, wherein the identifying the calcified region in the CT image comprises generating a probability map indicating a probability of each voxel in the CT image representing calcium, and wherein the target structure is an arterial lumen.

11. The method of claim 1, wherein one or more of the dense contracting block, the dense transition block, and the dense expanding block is a 12-layer dense block with a growth rate of four, or wherein the transition layer includes a batch normalization, a rectified linear unit (ReLU) activation, and a 3×3×3 convolutional layer.

12. The method of claim 1, wherein the output of the first stage of the contracting path is concatenated with the output of the second stage of the expanding path and input into the third stage of the expanding path, or wherein the output of the second stage of the contracting path is concatenated with the output of the first stage of the expanding path and input into the second stage of the expanding path.

13. The method of claim 1, wherein the neural network is trained using a plurality of images with no calcified regions prior to inputting the modified CT image.

14. The method of claim 1, wherein applying the inpainting mask includes modifying a brightness of at least each voxel in the calcified region of the initial CT image to be black.

15. The method of claim 1, further comprising:
identifying, using the processing device, an additional calcified region in the final CT image and one or more calcium-free regions in the final CT image, the one or more calcium-free regions in the final CT image including the calcium-free image patch and the one or more calcium-free regions from the initial CT image;
applying an additional inpainting mask corresponding to the additional calcified region in the final CT image to the final CT image to produce a modified final CT image, the modified final CT image showing the inpainting mask and the one or more calcium-free regions from the final CT image;
inputting the modified final CT image into the neural network that is trained to:
generate an additional calcium-free image patch from the additional inpainting mask in the modified final CT image, the additional calcium-free image patch corresponding to the additional calcified region in the final CT image; and
apply the additional calcium-free image patch to modified final CT image to produce an updated final CT image, the updated final CT image showing the calcium-free image patch and the calcium-free regions from the final CT image; and
receiving the updated final CT image from the neural network.

16. The method of claim 1, further comprising determining, using the processing device, whether a value of a property of each of a plurality of voxels in the initial CT image is greater than a threshold value, the value of the property of a respective voxel representing a value of a property of a material within the portion of the object being represented by the respective voxel, the value of the property of a respective voxel being greater than the threshold value indicating that the respective voxel represents calcium, wherein identifying the calcified region in the initial CT image and the one or more calcium-free regions in the initial CT image is based on the value of the property of the material represented by each of the plurality of voxels in the initial CT image.

17. A system for analyzing computed tomography (CT) images, comprising:
a CT scanner including an x-ray source, an x-ray detector, and a processing device configured to generate a CT image based on signals received by the x-ray detector from the x-ray source; and
a post-processing workstation, the post-processing workstation being configured to:
receive an initial CT image of a portion of an object, the initial CT image showing one or more calcium deposits in the portion of the object and at least some of a target structure in the portion of the object;
identify a calcified region in the initial CT image and one or more calcium-free regions in the initial CT image, the calcified region in the initial CT image showing the calcium deposits in the portion of the object;
apply an inpainting mask corresponding to the calcified region in the initial CT image to the initial CT image to produce a modified CT image, the modified CT image showing the inpainting mask and the one or more calcium-free regions;
input the modified CT image into a neural network that is trained to:
generate a calcium-free image patch from the inpainting mask in the modified CT image, the calcium-free image patch corresponding to the calcified region in the initial CT image; and
apply the calcium-free image patch to modified CT image to produce a final CT image, the final CT image showing the calcium-free image patch and the calcium-free regions from the initial CT image; and
receive the final CT image from the neural network, wherein:
the neural network is convolutional neural network that includes a contracting path, an expanding path, and a transition stage between the contracting path and the expanding path, the contracting path being configured to hierarchically extract features of the one or more calcium-free regions from the modified CT image, the expanding path being configured generate the calcium-free image patch from the extracted features and merge the calcium-free image patch with the calcium-free regions;
the expanding path includes:
(i) a first stage with one or more 1×1×1 convolution layers and one or more 3×3×3 deconvolution layers;
(ii) a second stage with a dense expanding block, and one or more 3×3×3 deconvolution layers;
and (iii) a third stage with one or more 1×1×1 convolution layers; and
the output of the transition stage is input into the first stage of the expanding path, the output of the first stage of the expanding path is input into the second stage of the expanding path, the output of the second stage of the expanding path is input into the third stage of the expanding path, and the output of the third stage of the expanding path is the final CT image.

18. A non-transitory, machine-readable medium having instructions stored thereon which, when executed by a machine processor, cause the machine processor to:
receive, by a processing device, an initial CT image of a portion of an object, the initial CT image showing one or more calcium deposits in the portion of the object and at least some of a target structure in the portion of the object;
identify, using the processing device, a calcified region in the initial CT image and one or more calcium-free regions in the initial CT image, the calcified region in the initial CT image showing the calcium deposits in the portion of the object;
apply an inpainting mask corresponding to the calcified region in the initial CT image to the initial CT image to produce a modified CT image, the modified CT image showing the inpainting mask and the one or more calcium-free regions;
input the modified CT image into a neural network that is trained to:
generate a calcium-free image patch from the inpainting mask in the modified CT image, the calcium-free image patch corresponding to the calcified region in the initial CT image; and
apply the calcium-free image patch to modified CT image to produce a final CT image, the final CT image showing the calcium-free image patch and the calcium-free regions from the initial CT image; and
receive the final CT image from the neural network,
wherein:
the neural network is convolutional neural network that includes a contracting path, an expanding path, and a transition stage between the contracting path and the expanding path, the contracting path being configured to hierarchically extract features of the one or more calcium-free regions from the modified CT image, the expanding path being configured generate the calcium-free image patch from the extracted features and merge the calcium-free image patch with the calcium-free regions;
the expanding path includes:
(i) a first stage with one or more 1×1×1 convolution layers and one or more 3×3×3 deconvolution layers;
(ii) a second stage with a dense expanding block, and one or more 3×3×3 deconvolution layers;
and (iii) a third stage with one or more 1×1×1 convolution layers; and
the output of the transition stage is input into the first stage of the expanding path, the output of the first stage of the expanding path is input into the second stage of the expanding path, the output of the second stage of the expanding path is input into the third stage of the expanding path, and the output of the third stage of the expanding path is the final CT image.

* * * * *